United States Patent [19]
Chiang

[11] Patent Number: 5,763,785
[45] Date of Patent: Jun. 9, 1998

[54] INTEGRATED BEAM FORMING AND FOCUSING PROCESSING CIRCUIT FOR USE IN AN ULTRASOUND IMAGING SYSTEM

[75] Inventor: Alice M. Chiang, Weston, Mass.

[73] Assignee: Massachusetts Institute of Technology, Cambridge, Mass.

[21] Appl. No.: 496,915

[22] Filed: Jun. 29, 1995

[51] Int. Cl.[6] ............................................. G01N 29/06
[52] U.S. Cl. ........................................ 73/609; 73/617
[58] Field of Search ........................ 73/606, 609, 611, 73/617, 618, 626, 628, 629

[56] References Cited

U.S. PATENT DOCUMENTS

| | | | |
|---|---|---|---|
| 4,058,003 | 11/1977 | Macovski | 73/609 |
| 4,140,022 | 2/1979 | Maslak | 73/626 |
| 4,152,678 | 5/1979 | Shott et al. | 73/619 |
| 4,170,766 | 10/1979 | Pridham et al. | 367/135 |
| 4,173,007 | 10/1979 | McKeighen et al. | 73/609 |
| 4,180,790 | 12/1979 | Thomas | 73/626 |
| 4,208,916 | 6/1980 | Thomenius et al. | 73/626 |
| 4,213,195 | 7/1980 | Pridham | 367/92 |
| 4,280,203 | 7/1981 | Gilmour | 367/103 |
| 4,288,764 | 9/1981 | Ong | 307/221 |
| 4,290,310 | 9/1981 | Anderson | 73/626 |
| 4,386,529 | 6/1983 | Engle | 73/606 |
| 4,401,957 | 8/1983 | McKeighen et al. | 333/165 |
| 4,542,653 | 9/1985 | Liu | 73/626 |
| 4,598,589 | 7/1986 | Riley et al. | 73/609 |
| 4,663,973 | 5/1987 | Iida et al. | 73/609 |
| 4,699,009 | 10/1987 | Maslak et al. | 73/626 |
| 4,700,571 | 10/1987 | Okazaki | 73/626 |
| 4,707,813 | 11/1987 | Moeller et al. | 73/626 |
| 5,063,541 | 11/1991 | Kondo et al. | 367/105 |
| 5,092,337 | 3/1992 | Uchiumi et al. | 73/626 |
| 5,129,399 | 7/1992 | Hirama | 73/626 |
| 5,143,075 | 9/1992 | Ishizaka | 73/626 |
| 5,235,983 | 8/1993 | Iida et al. | 73/625 |
| 5,269,307 | 12/1993 | Fife et al. | 73/625 |
| 5,322,068 | 6/1994 | Thiele et al. | 73/625 |
| 5,343,864 | 9/1994 | Sugiyama | 73/626 |
| 5,357,962 | 10/1994 | Green | 73/626 |
| 5,417,217 | 5/1995 | Morita et al. | 73/626 |
| 5,522,391 | 6/1996 | Beaudin et al. | 128/660.07 |
| 5,535,150 | 7/1996 | Chiang | 364/724.19 |
| 5,590,658 | 1/1997 | Chiang et al. | 128/661.01 |

*Primary Examiner*—Christine K. Oda
*Attorney, Agent, or Firm*—Samuels, Gauthier, Stevens & Reppert

[57] ABSTRACT

A beam forming and focusing processing circuit for use in an ultrasound imaging system. The system incorporates a plurality of the processing circuits which differentially delay imaging signals in order to generate an output in which the imaging signals from each circuit implement the desired differential delay. Each of the processing circuits include a first delay line having a plurality of delay units operable for receiving the imaging signals and converting same into sampled data. A selection control circuit is operable for reading the sampled data from a selected first delay unit of the first delay line so as to correspond to a selected first time delay to accommodate fine delay resolution of the imaging signals. A second delay line having a plurality of delay units is operable for sensing the sampled data from the selected first delay unit. The control circuit is further operable for reading the sampled data from a selected second delay unit of said second delay line so as to correspond to a selected second delay time to accommodate coarse delay resolution of the imaging signals. The processing circuits are preferably integrated onto a single microchip.

28 Claims, 9 Drawing Sheets

INTEGRATED BEAM FORMING AND FOCUSING PROCESSING CIRCUIT FOR USE IN AN ULTRASOUND IMAGING SYSTEM

This invention was made with government support under Number F19628-90-C-0002 awarded by the Air Force. The government has certain rights in the invention.

BACKGROUND OF THE INVENTION

The invention relates to a directional beam forming and focusing processing circuit for use in an ultrasound imaging system.

Figure 1A:
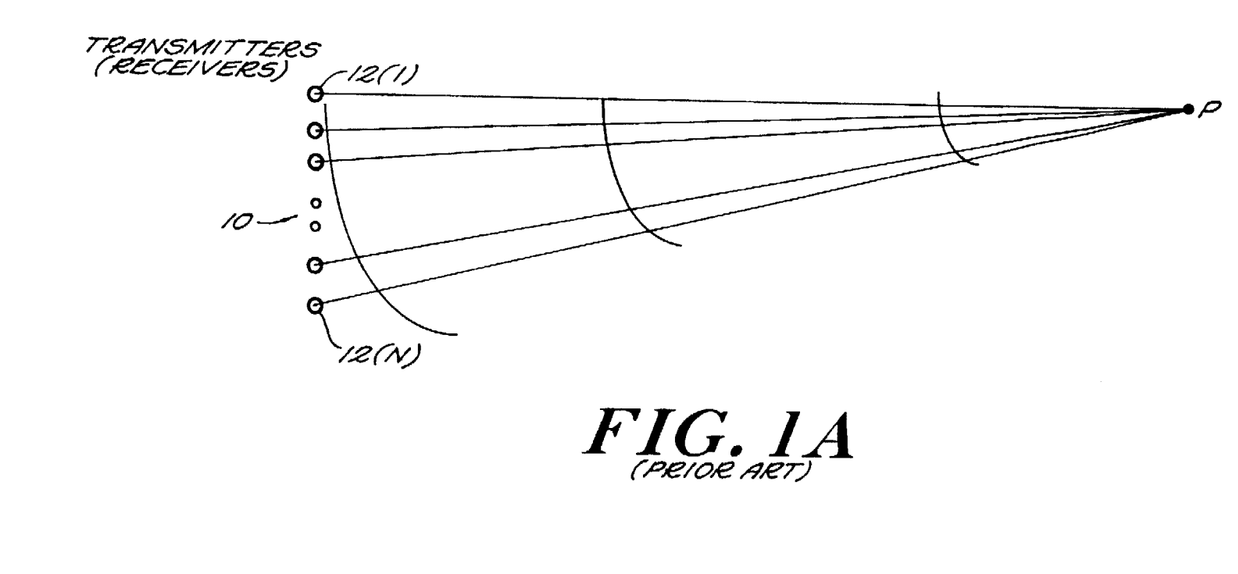
FIGS. 1A and 1B respectively show a block diagram of a conventional imaging array as used in an ultrasound imaging system and associated transmitting pulse patterns of a single pulse and multiple pulses in a zone-focused mode.

In conventional ultrasound systems, acoustic transducer sensor arrays are used for noninvasive medical diagnostic imaging or nondestructive material testing applications. A schematic block diagram of an imaging array 10 as used in an ultrasound imaging system is shown in FIG. 1A. The array of transmitting transducer elements $12(1)-12(N)$ generate acoustic pulses which propagate into the transmitting media with a narrow beam. The pulses propagate as a spherical wave with a constant velocity. Acoustic echoes in the form of returning signals from image points P or reflectors are detected by the same array of transducer elements or another receiving array.

The acoustic echo from the point P in the transmitting media reaches each transducer element of the receiving array after various propagation times. The propagation time for each transducer element is different and depends only on the distance between each transducer element and the point P. This holds true for typical ultrasound transmitting media, i.e. soft bodily tissue where the velocity of sound is constant. Thereafter, the received information is displayed in a manner to indicate the location of the reflecting structure. The pulses can be transmitted along a number of lines-of-sight to form a two-dimensional image. If the echoes are sampled and their amplitudes are coded as brightness as is well known in the art, a grey scale image can be displayed on a CRT or a LCD screen.

The radiating (azimuth) beam pattern of a conventional array is controlled primarily by applying delayed transmitting pulses to each transducer element in such a manner that the energy from all the transmitters summed together at the image point produce a desired beam shape. Therefore, a time delay circuit is needed in association with each transducer element for producing the desired transmitted radiation pattern along the predetermined direction.

Figure 1B:
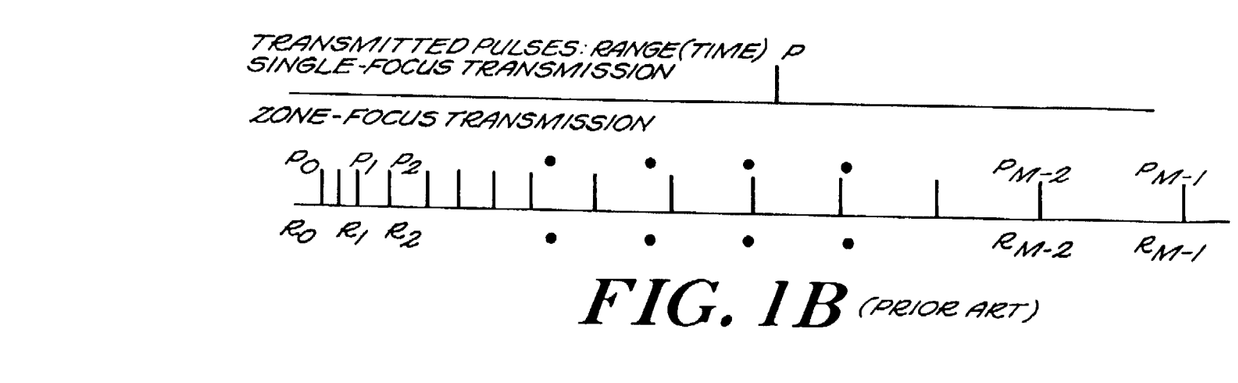

For a given azimuth angle, as can be seen in FIG. 1B, there can be two different transmitting patterns: a single pulse focused at mid-range of the image line or multiple pulses in a zone-focused mode. In a single pulse mode, the azimuth focus depth can be electronically varied, but remains constant for any predetermined direction. For multiple pulse operation, the array of transmitters is focused at M focal zones along each scan direction, i.e., a series of M pulses is generated, $P_0, P_1, \ldots, P_{M-1}$, each pulse being focused at its corresponding range $R_0, \ldots, R_{M-1}$, respectively. The pulses are generated in a repeated sequence so that, after start up, every Mth pulse corresponds to the initial pulse $P_0$. For the zone-focused mode, a programmable time-delay circuit is needed in association with each transducer element to produce beam patterns focused at different focal zones.

As previously described, the same array of transducer elements can be used for receiving the return signals. The reflected or echoed beam energy waveform originating at the image point reaches each transducer element after a time delay equal to the distance from the image point to the transducer element divided by the speed of the waveform of signals in the media. Similar to the transmitting mode, this time delay is different for each transducer element. At each receiving transducer element, these differences in path length should be compensated for by focusing the reflected energy at each receiver from the particular image point.

Figure 2A:
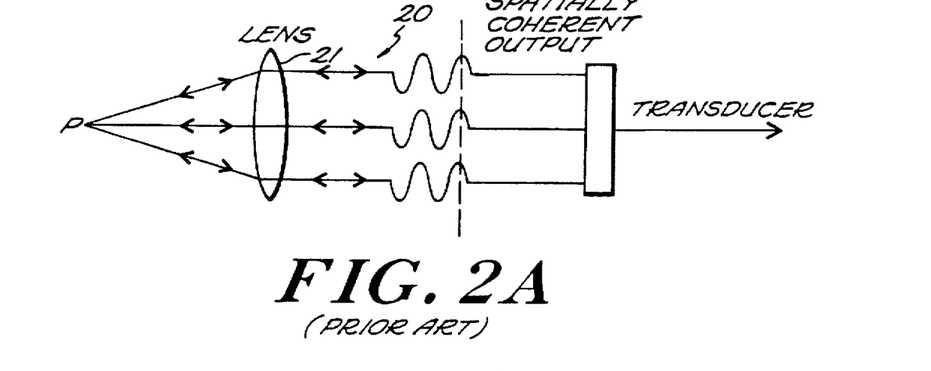
FIGS. 2A–2C respectively show block diagrams of three different conventional imaging or beam focusing techniques involving acoustic lens, time delay and phase delay operations.
Figure 2B:
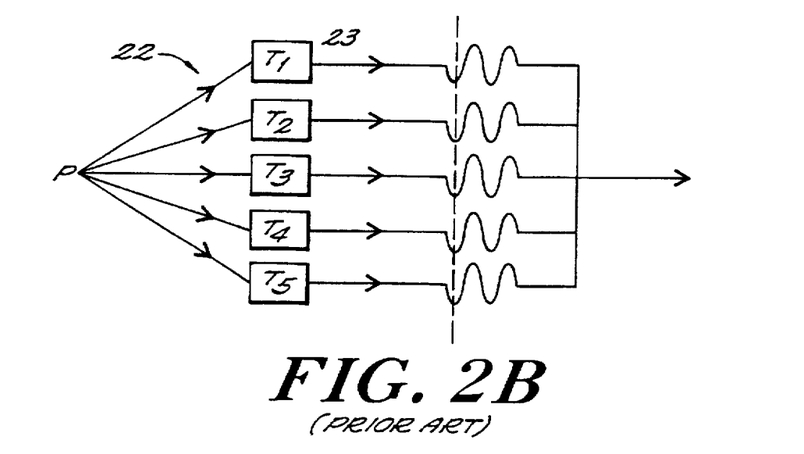
Figure 2C:
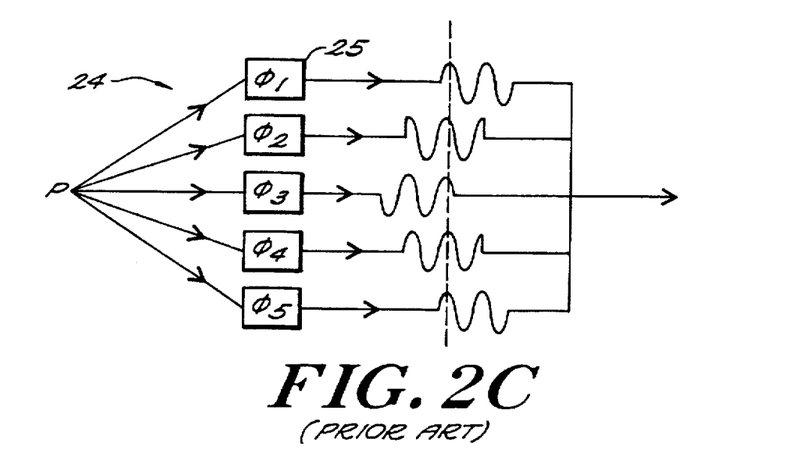

The beam forming and focusing operation involves forming a summation of the waveforms as observed by all the receiving transducer elements. However, the waveforms must be differentially delayed so that they all arrive in phase prior to the summation. FIGS. 2A–2C show schematic block diagrams of three different conventional imaging or beam focusing techniques. A non-programmable physical lens acoustic system 20 using an acoustic lens 21 is shown in FIG. 2A. In turn, dynamic focusing systems where associated signal processing electronics are employed to perform real-time time delay and phase delay focusing functions are respectively shown in FIGS. 2B and 2C. FIG. 2B shows a time delay system 22 using time delay elements 23, and FIG. 2C shows a phase delay system 24 using phase delay elements 25.

In the lensless systems of FIGS. 2B and 2C, the signal processing elements 23, 25 are needed in association with each receiving transducer element, thus defining processing channels, to provide time delay and focus incident energy from a field point to form an image. Accordingly, a beam forming circuit is required which can provide a different delay on each processing channel, and to further vary that delay with time. Along a predetermined direction, as echoes return from distances further away from the array of transducer elements, the receiving array varies its focus continually with depth. This process is conventionally known as dynamic focusing.

After the received beam is formed, it is digitized in a conventional manner. The digital representation of each received pulse is a time sequence corresponding to a scattering cross section of ultrasonic energy returning from a field point as a function of range at the azimuth formed by the beam. Successive pulses are pointed in different directions, covering a field of view from $-45°$ to $+45°$. In some systems, time averaging of data from successive observations of the same point (referred to as persistence weighting) is used to improve image quality.

For example, in an ultrasound imaging system operating at a 2–5 MHz frequency range, an electronic circuit capable of providing up to 10 to 20 µs delay with sub-microsecond time resolution is needed for the desired exact path compensation. As shown in FIG. 2B, a delay line is inherently matched to the time-delay function needed for dynamic focusing in a lensless ultrasound system.

More specifically, in an exemplary ultrasound imaging system with a 5 MHz operating frequency and an array of 128 transducer elements on half-wavelength centers, a straightforward delay implementation requires each processing channel/transducer element to include either a 480-stage delay line with a clock period programmable with a 25 ns resolution or a 480-stage tapped delay line clocked at 40 MHz in conjunction with a programmable 480-to-one time-select switch to set the appropriate delay. There are two problems associated with these conventional techniques. First, a simple variable-speed clock generator has not been developed to date. Secondly, for an N-stage tapped delay line, the area associated with the tap select circuit is proportional to $N^2$, thus such a circuit would require a large amount of microchip area to realize an integrated tap architecture.

Due to the difficulty and complexity associated with the generation of the control circuits of the conventional approach, only a few time-delay structures could be integrated on one microchip, and therefore a large number of chips would be needed to perform a multi-element dynamic beam forming function. For these reasons, none of the prior art ultrasound imaging systems utilize the straightforward time-delay implementation. Instead, a plane-wave mixer approximation is used. In this approximation process, the total delay is separated into two parts: an analog plane-wave mixer technique is used to approximate the required fine delay time and a true coarsely spaced delay line is used to achieve the coarse delay time.

In accordance with the plane-wave approximation, the fine delay can be achieved by modifying the phase of AC waves received by each receiving processing channel and implemented by heterodyning the received waves from each receiving transducer element with different phases of a local oscillator, i.e., creating analog phase shifting at each processing channel. Specifically, by selecting a local oscillator with a proper phase angle of the form $\cos(\omega_o t + \Omega_n(t))$, where $\Omega_n$ is chosen to satisfy the expression $\Omega_n(t) = \omega_o(T_n(t) - T'_n(t))$. $T_n(t)$ is the ideal compensating delay and $T'_n(t)$ is a coarsely quantized approximation of $T_n$. It will be appreciated that when the mixer output is delayed by $T'_n$, the phase of one of its intermediate frequency (IF) sidebands provides phase coherence among all the processing channels.

In the conventional implementation of the aforementioned technique, a tap select is used which connects any received down-conversion mixer output to any tap on a coarsely spaced, serially connected delay line. The tap select is essentially a multiposition switch that connects its input to one of a number of output leads. One output lead is provided for each tap on the delay line. Therefore, each mixer output can be connected to a few coarsely spaced taps on a delay line, and all the tap outputs can be summed together coherently. However, for an exemplary 5 MHz operation, if a single-mixer arrangement as described above is used, a delay line with delay resolution less than one microsecond is needed.

In summary, the conventional technique described heretofore involves heterodyning the received signals with an oscillator output by selecting a local oscillator frequency so as to down convert the output to an IF frequency. This down converted signal is then applied to another mixer. By selecting the proper phase angle of the second oscillator, the phase of the intermediate frequency waves produced by the second heterodyning is controlled. The output of the second mixer is then connected through a tap select to only one or at the most a few coarsely spaced taps on a delay line during the focal scanning along each direction.

The aforementioned approximation technique is used due to the fact that given an image that is somewhat out of focus, the image can be focused in an economically feasible manner by utilizing readily available techniques such as analog mixers and RC networks. Unfortunately, the mixer approximation method suffers from image misregistration errors as well as signal loss relative to the ideally-focused (perfect delay) case.

SUMMARY OF THE INVENTION

It is an object of the present invention to provide a beam forming and focusing circuit which is integrated on a single microchip.

It is another object of the present invention to provide a circuit architecture for a beam forming and focusing circuit which utilizes cascaded charge-coupled device tapped delay lines.

Accordingly, the present invention provides an image data processing system for ultrasound beam-forming and focusing. The system includes a plurality of processing circuits which, in a receiving mode, differentially delay signals representative of image waveforms, received as reflected ultrasonic energy from a target object by an array of receivers, in order to generate a focused image. In a transmitting mode, the processing circuits differentially delay imaging signals, which are to be transmitted as ultrasonic energy to a target object by an array of transmitters, in order to generate a focused directional beam.

Each of the processing circuits include a first delay line having a plurality of delay units operable in the receiving mode for receiving signals representative of an image waveform and converting same into sampled data. In the transmitting mode, the first delay line receives the imaging signals and converts same into sampled data. A selection control circuit is operable for reading the sampled data from a selected first delay unit of the first delay line so as to correspond to a selected first time delay to accommodate fine delay resolution of the signals representative of the image waveform or imaging signals. A second delay line having a plurality of delay units is operable for sensing the sampled data from the selected first delay unit. The control circuit is further operable for reading the sampled data from a selected second delay unit of said second delay line so as to correspond to a selected second delay time to accommodate coarse delay resolution of the signals representative of the image waveform or imaging signals.

In the receiving mode, a summation circuit is provided for summing the sampled data from each of the selected second delay units in each of the processing circuits in order to produce a focused image. In the transmitting mode, an output circuit is provided for converting the sampled data from each of the selected second delay units in each of the processing circuits into signals representative of the focused directional beam.

DETAILED DESCRIPTION OF THE ILLUSTRATED EMBODIMENTS

Figure 3:
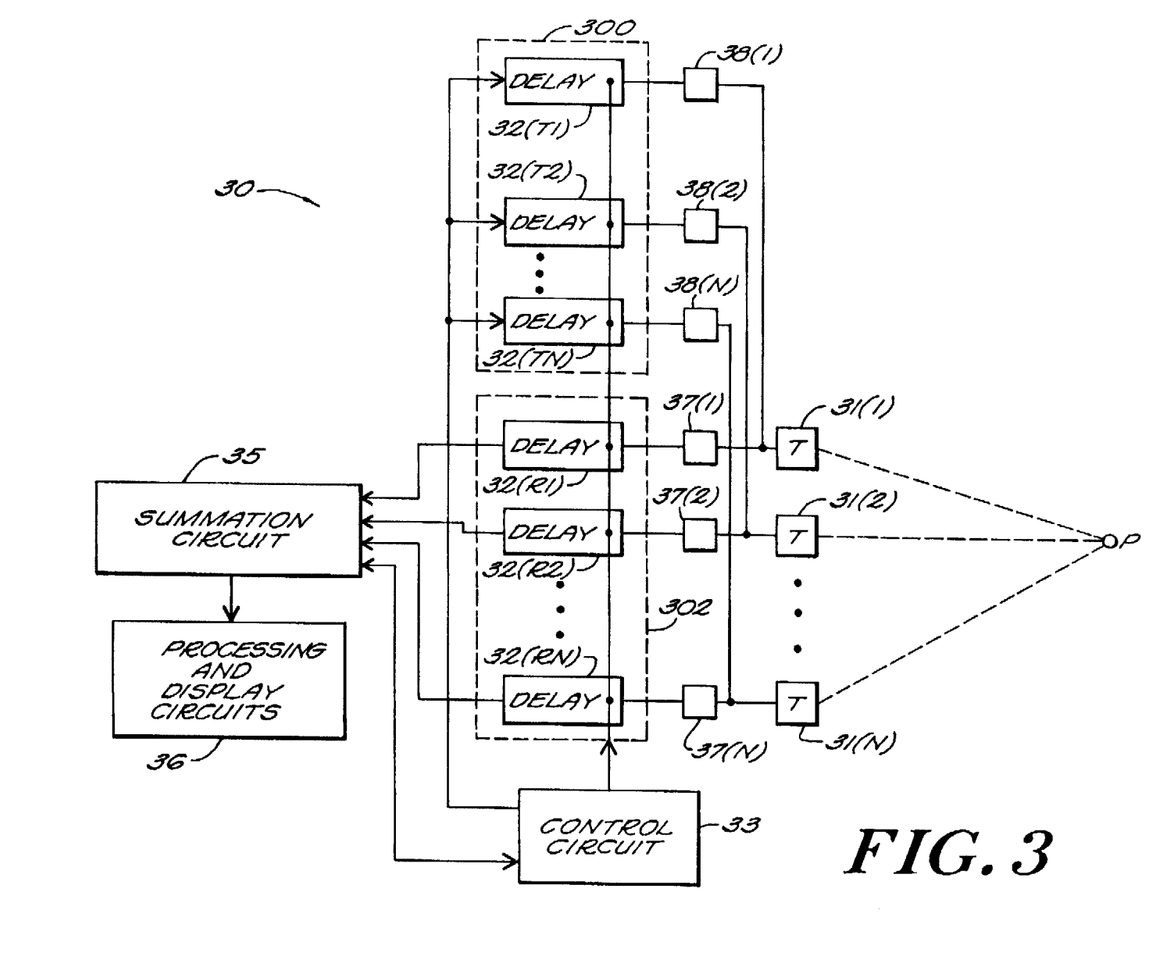
FIG. 3 shows an operational block diagram of an ultrasound imaging system incorporating the beam forming and focusing circuit of the present invention.

FIG. 3 shows a block diagram of an ultrasound imaging system 30 which includes an array of transducer elements 31(1)–31(N) that function to both transmit a waveform of ultrasonic pulses to an object P to be imaged and receive the acoustic echoes reflected from the object. The transducer elements are of the type which are integrated in a conventional transducer unit used in an ultrasound imaging system, and are capable of converting electric signals into ultrasonic pulses and reconverting the acoustic echoes back into electrical signals for processing.

A plurality of beam forming and focusing processing circuits 32(R1)–32(RN) and 32(T1)–32(TN), in accordance with the present invention, are provided for implementing desired delays to the signals being provided to and from the transducer elements. The processing circuits define a set of processing channels which are used for dynamic beam forming and steering in a transmission mode and dynamic focusing and image forming in a receiving mode. The operation of the processing circuit 32 will be described with respect to operations in both the transmitting and receiving modes. As will be described in more detail hereinafter, in a preferred embodiment of the present invention, the set 300 of processing circuits 32(R1)–32(RN) and the set 302 of processing circuits 32(T1)–32(TN) are respectively constructed on single semiconductor microchips.

It will be appreciated by those skilled in the art that the beam forming and focusing operation involve forming a summation of the waveforms as observed by all of the transducer elements. However, in this summation, the waveforms must be differentially delayed so that they all arrive in phase at a summation circuit 35. Accordingly, each processing circuit 32 in accordance with the present invention provides a different time delay on each processing channel, and further varies that delay with time. The signals which are added in phase to produce a focused signal are then applied to processing and display circuits 36.

For each nominal scanning direction, the differential delay required for information received by a transducer element 31(k) in the array, relative to the first element 31(1), varies predominantly with k, with a small correction as a function of time to correct focus for depth. The overall control of delay can involve very fine time resolution as well as a large range of delays. However, for a selected beam forming direction, this set of delays is achieved by a combination of a coarse delay in each channel to approximately compensate for direction, and a fine delay for each channel which combines the functions of focusing and refining the original coarse correction.

The clocking frequencies for each of the fine and coarse delay lines can be set at different constant rates for each scanning image. The clocking frequencies are adjustable for different types of transducer arrays. For example, the clocking frequency of the fine delay line is preferably eight times the ultrasound waveform frequency. In turn, the clocking frequency for the coarse delay line is preferably one-tenth the fine delay line clocking frequency.

The imaging system 30 preferably contains a control circuit 33 which serves to regulate the transmission and reception of ultrasonic signals by the transducer elements as well as provide the appropriate clocking signals. In the transmitting mode, the control circuit provides an appropriately conditioned sequence of signals to the processing circuits 32(T1)–32(TN) for the implementation of the desired delay. The outputs from the processing circuits are provided to respective high voltage driving circuits 38(1)–38(N). The driving circuits in turn drive the respective transducer elements in order to generate the appropriate ultrasonic pulse signals for transmission.

In the receiving mode, the transmit pulse circuit is disabled and the processing circuits 32(R1)–32(RN) are appropriately controlled to propagate the signals received from amplifier circuits 37(1)–37(N) and the transducer elements which receive the acoustic echoes. Each transducer element converts the received ultrasonic signal into a representative electrical signal which is forwarded to the respective amplifier circuits 37. Each amplifier circuit includes preamplification and time-varying gain control (TGC) circuitry. The preamplification circuitry sets the level of the electrical signals from the transducer elements at a level suitable for subsequent processing, and the TGC circuitry is used to compensate for attenuation of the ultrasonic signals as it penetrates through, for example, human tissue. The conditioned signals are forwarded to the processing circuits 32(R1)–32(RN) which introduces the appropriate differential delay in each of the received signals. The signals are then summed by a summation circuit 35 in order to dynamically focus the signals such that an accurate image can be created by processing and display circuits 36.

An exemplary imaging system in which the present invention may be utilized is described in copending U.S. patent application Ser. No. 08/496,804, entitled "Portable Ultrasound Imaging System", filed concurrently herewith by Chiang et al., now U.S. Pat. No. 5,590,658.

Figure 4:
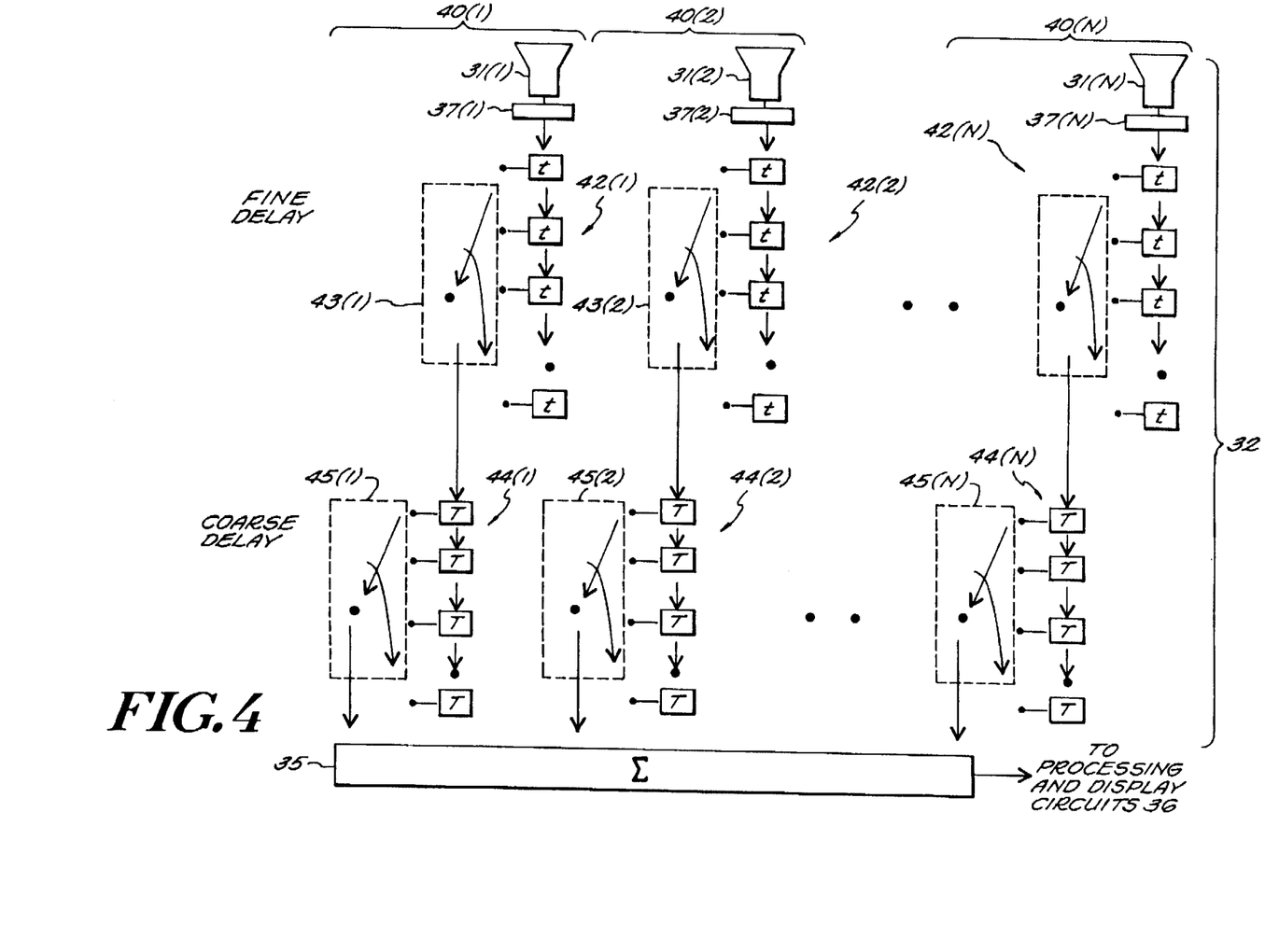
FIG. 4 shows an operational block diagram of an array of the beam forming and focusing circuits in accordance with the present invention.

According to a preferred embodiment shown in operational block diagram form in FIG. 4, each of the processing circuits 32 are respectively arranged in a predetermined set of N-parallel processing channels 40(1)–40(N), one for each of the array of transducer elements 31(1)–31(N). Each processing circuit 32 includes two cascading tapped delay lines 42(1)–42(N), 44(1)–44(N). The first delay line 42 in each channel provides a fine time delay for the received signals, while the cascaded second delay line 44 provides a course time delay. Each fine delay line has an associated programmable tap-select circuit 43(1)–43(N), and each coarse delay line has a programmable tap-select circuit 45(1)–45(N), both of which will be described in more detail hereinafter. The tap-select circuits are operable for effecting a variable delay time as a function of tap location.

During the operation of the processing circuits 32, signals which are received by the transducer elements 31 are applied continuously to the input of its corresponding processing channel 40. The input signals to each processing channel are converted into a sequence of sampled data for initial propagation through the respective fine tapped delay lines 42. In accordance with a preferred embodiment of the present invention, both the fine 42 and coarse 44 tapped delay lines are charge-coupled device (CCD) tapped delay lines. Exemplary programmable CCD tapped delay lines are described in, for example, Beynon et al., *Charge-coupled Devices and Their Applications*, McGraw-Hill (1980), incorporated herein by reference. Accordingly, in the exemplary configuration of the processing circuit 32 using CCD delay lines, the input signals to each of the processing channels are converted to a sequence of charge packets for subsequent propagation through the fine and coarse delay lines.

At a predetermined time, which is dependent on the tap location selected by the system 30, a delayed sample, in the form of charge, is either destructively or nondestructively sensed from the selected tap of the fine delay line 42. The delayed sample is in turn input to the front end of the corresponding coarse delay line 44. The selected delay samples thereafter propagate through the coarse delay line, and are again either destructively or nondestructively sensed at a properly selected tap location corresponding to a predetermined time delay designated in accordance with the operation of the control circuit 33 of the ultrasound imaging system 30 in which the invention is utilized. The sensed sampled data from the coarse delay line of each processing channel is simultaneously summed by a summation circuit 35 to form signals representative of the output beam.

Figure 5:
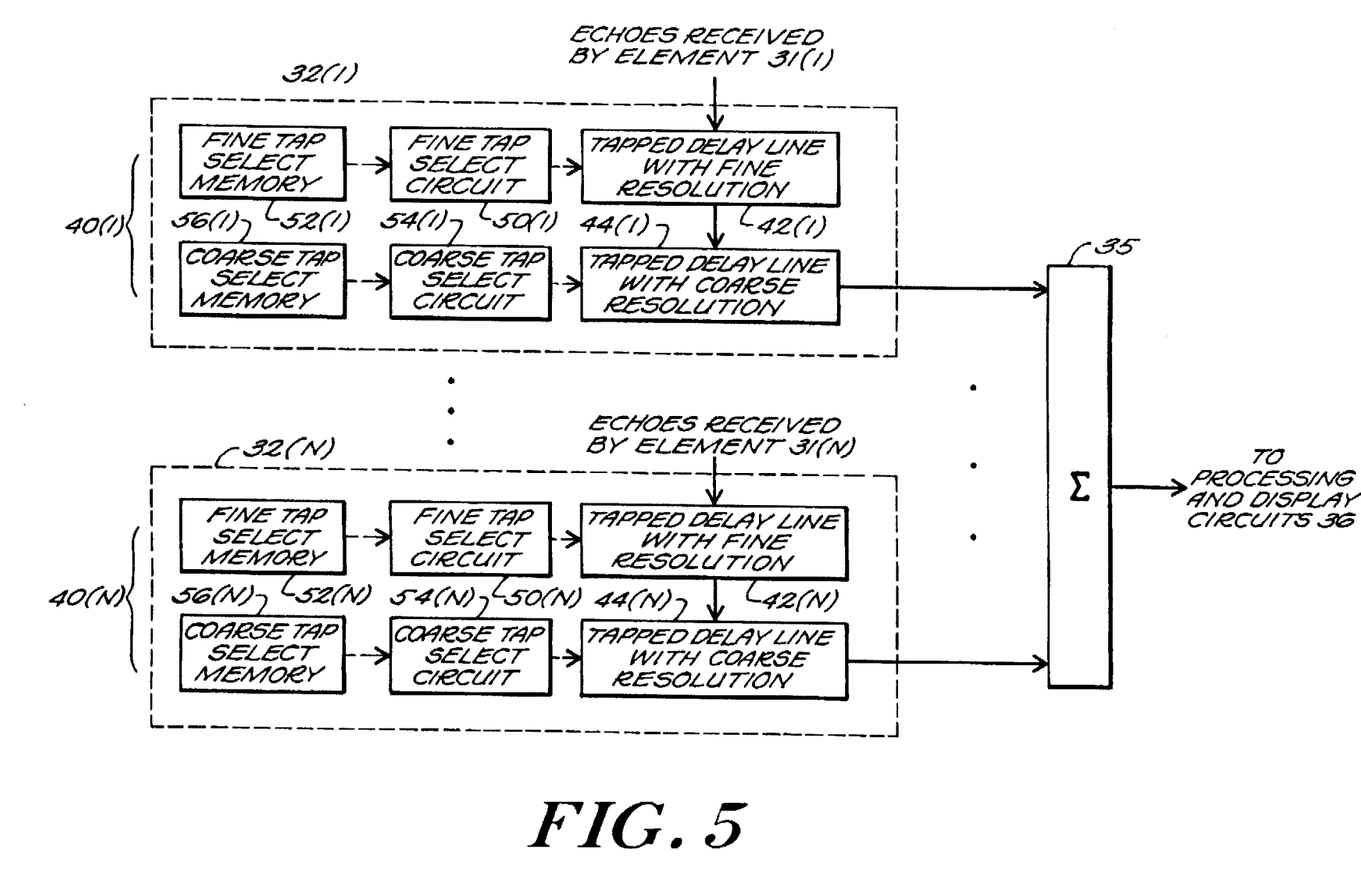
FIG. 5 shows a more detailed operational block diagram of an array of the beam forming and focusing circuits in accordance with the present invention.

With reference now to FIG. 5, a more detailed operational block diagram of the processing circuits 32(1)-32(N) of the present invention is shown. As illustrated, the programmable tap-select circuits 43(1)-43(N) for the fine delay lines each include respective fine tap select circuits 50(1)-50(N) and fine tap select memory units 52(1)-52(N). In turn, the programmable tap-select circuits 45(1)-45(N) for the coarse delay lines each include respective coarse tap select circuits 54(1)-54(N) and coarse tap select memory units 56(1)-56(N).

In accordance with a preferred embodiment of the present invention, the fine and coarse delay lines of each processing circuit have differing clock rates. The fine delay line is clocked at a higher rate than that of the coarse delay line, and is therefore capable of providing a much finer delay time than that of the coarse delay line. For instance, in an exemplary configuration, each circuit 32 has a 32-stage fine tapped delay line clocked at 40 MHz and a 32-stage coarse-tapped delay line clocked at 2 MHz. Such a configured circuit can provide up to a 16 μs delay with a programmable 25 ns delay resolution. In contrast, it will be appreciated that if a single delay line were used, it would require approximately 640 stages of delays. Furthermore, due to the cascaded delay line structure of the present invention, a local memory of 5-bit wide by 64-stage is adequate for providing the dynamic focusing function for a depth up to 15 cm. However, if a single delay structure were used, it would require a local memory of 640-bit wide by 1280-stage long.

During operation of an individual processing circuit 32, the fine delay line taps are changed continuously by the control circuit 33 of the imaging system during each echo receiving time to provide dynamic focusing. The fine tap select circuit 50, in the form of a digital decoder, and the local fine tap select memory 52 are used to select the desired tap position of the fine delay line 42. For example, the control circuit instructs the memory 52 to provide a digital address representative of the selected tap position to the select circuit 50 for decoding. In turn, the select circuit 50 effects the sampling of data from the selected tap. In an exemplary embodiment, a 5-bit decoder is used to provide a 32-tap selection.

The tap position of the coarse delay line 44 is set once before each echo return and is not changed during each azimuth view direction. As with the operation of the fine delay line, the coarse tap select circuit 54, in the form of a digital decoder, is used in conjunction with the local coarse tap select memory 56 to select the desired tap position of the coarse delay line.

Figure 6:
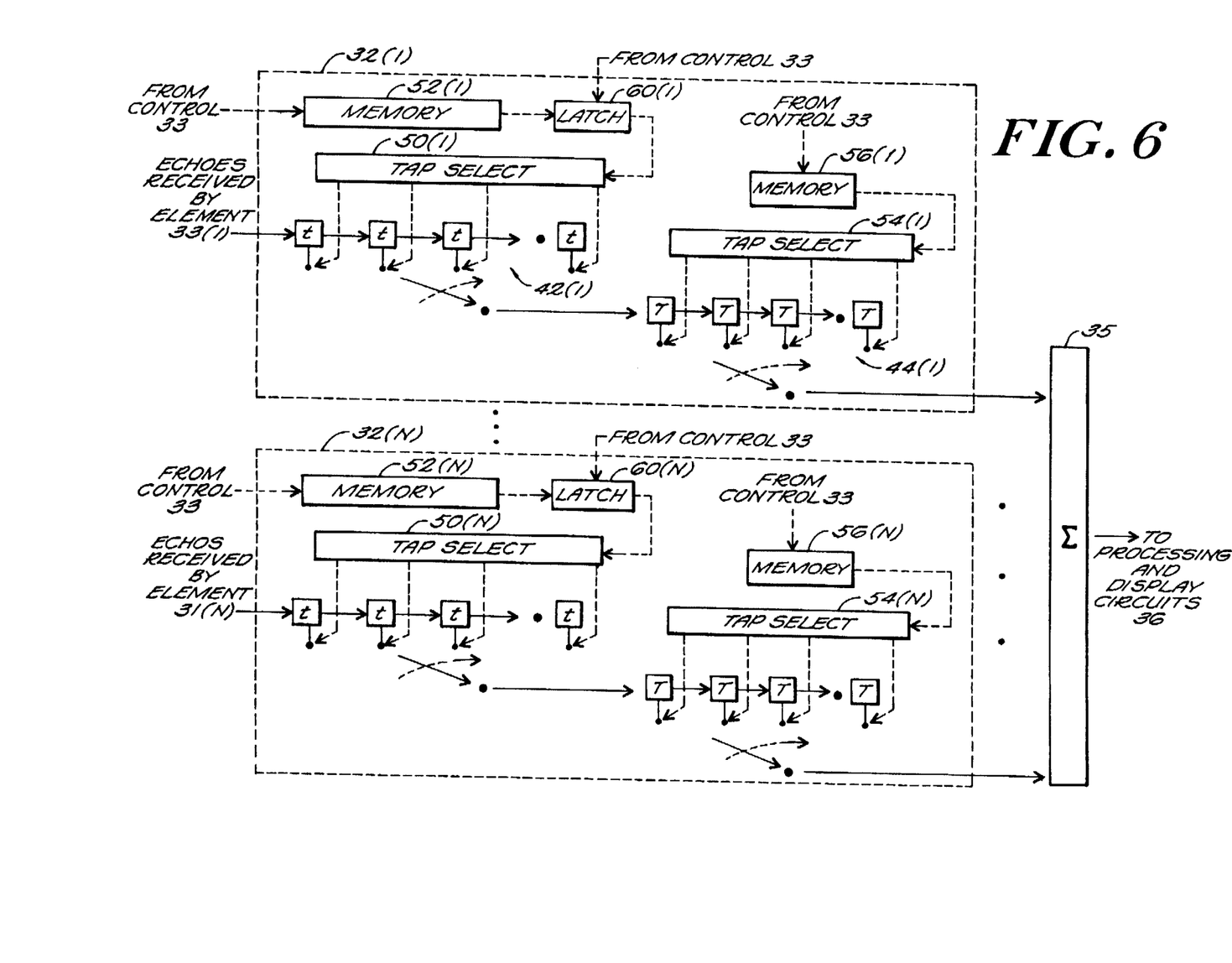
FIG. 6 shows an operational block diagram of an alternative embodiment of the present invention in which each of the beam forming and focusing circuits incorporates a latching circuit.

FIG. 6 shows an operational block diagram of an alternative embodiment of the present invention including an array of the processing circuits 32(1)-32(N), each of which includes a respective latching circuit 60(1)-60(N) that generates a tap setting signal to each of the fine tap select circuits 50(1)-50(N). When the tap setting signal is provided to the fine tap select circuits, the tap selection will be fixed at the last tap of the fine tap delay lines (i.e. focusing point), thus the dynamic focusing function is not operable. This operation is controlled by the imaging system in situations where, for example, the imaging point is at a distance from the transducer elements which does not require a precise fine delay time. In this manner, the size of the fine tap select memory 52 is reduced.

Figure 7:
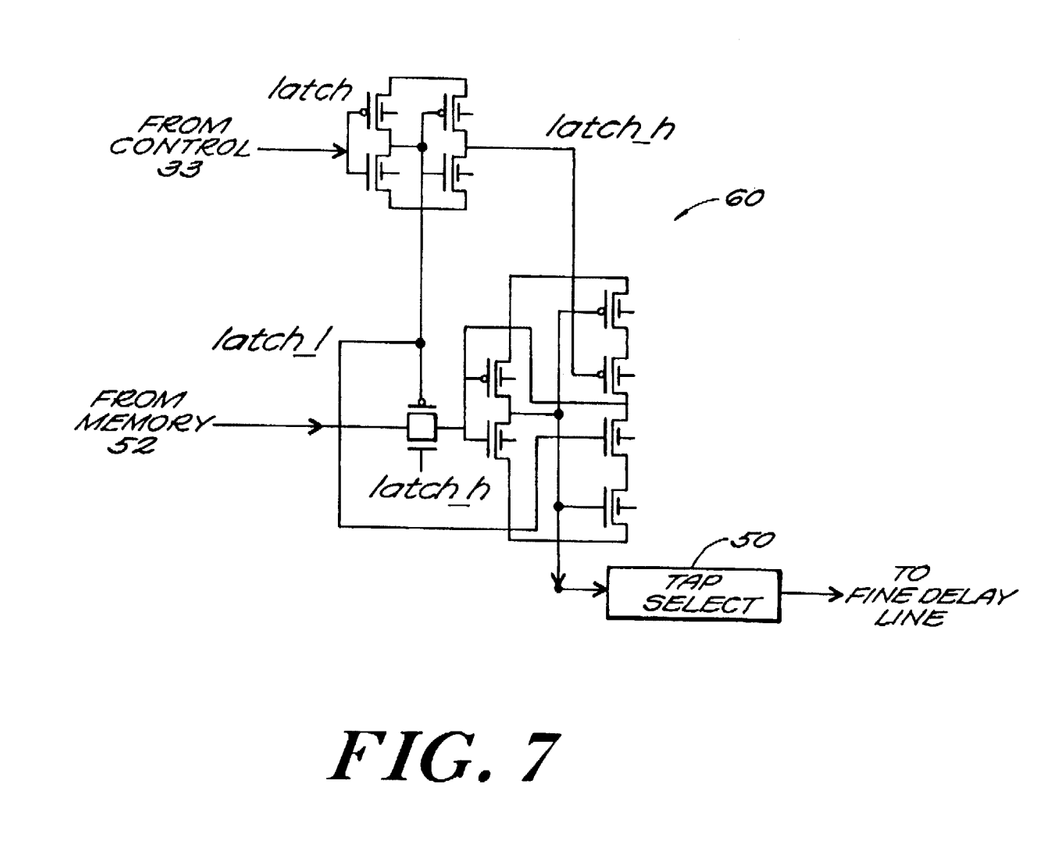
FIG. 7 shows a schematic block diagram of an exemplary embodiment of the latching circuit used in accordance with the present invention.

An exemplary embodiment of the latching circuit 60 in accordance with the present invention is shown in FIG. 7. In operation, when the latch is set high by the control circuit 33, digital data from the memory 52 will pass through the CMOS passing transistors, and the defined transistor inverter provides an input to the appropriate tap select circuit (decoder) 50 so as to implement the dynamic focusing function. In contrast, when the latch is set low, the passing transistors are disabled, and thus the inverter output will be latched to the last data address in the memory, i.e., the last tap select position.

Using a conventionally known 1.2-μm CCD/CMOS fabrication process available through a conventionally known Si foundry, Orbit Semiconductor, Inc., a prototype 10-channel beam forming microchip based on the fine/coarse delay architecture of the present invention as shown in FIG. 5 has been designed and fabricated. Due to the compactness of each fine and coarse delay line, and the simplification of its corresponding control circuits, this approach accommodates configuring the beam forming electronics of a 64-element receiver array to be integrated on one single microchip.

In the prototypical beam forming microchip, each processing circuit includes two cascaded programmable tapped delay lines (each 16-stages long), two 4-bit CMOS decoders and a 4×64-bit local memory for storing the tap locations. The prototype is configured with 10 processing channels, each of which includes the processing circuit of the present invention fabricated on a single silicon microchip. Each processing circuit can provide up to 10 μs of programmable delay with a 25 ns delay resolution. The beam forming chip operates such that at each azimuth viewing angle, echo return signals from an image point at a given range resolution received by a transducer element are sampled by the corresponding processing channel. Each processing circuit provides ideally compensated delays to each received return signal. All of the delayed outputs are then summed together to form a single beam or a focused image point. The chip area associated with each processing channel is only 500× 2000 μm². It follows that the dynamic beam forming electronics for a 64-element receiver array can be integrated in a single microchip with chip area as small as 64 mm², which corresponds to at least three to four order of magnitude size reduction compared to conventional devices.

The fine-coarse tapping architecture of the present invention accommodates a 12 μs delay with a 25 ns resolution with the two cascaded CCD tapped delay lines. Specifically, a first 16-stage long delay line clocked at 40 MHz and a second 32-stage long delay line clocked at 2 MHz. The shorter delay lines and the simplicity of the tapping circuit associated with these shorter delay lines allows all of the image-generating electronics to be integrated on a single chip. A single chip performs the electronic focus function for a 128-element array with more than two-orders-of-magnitude reduction in chip area, power consumption and weight when compared with conventional implementations.

Figure 8:
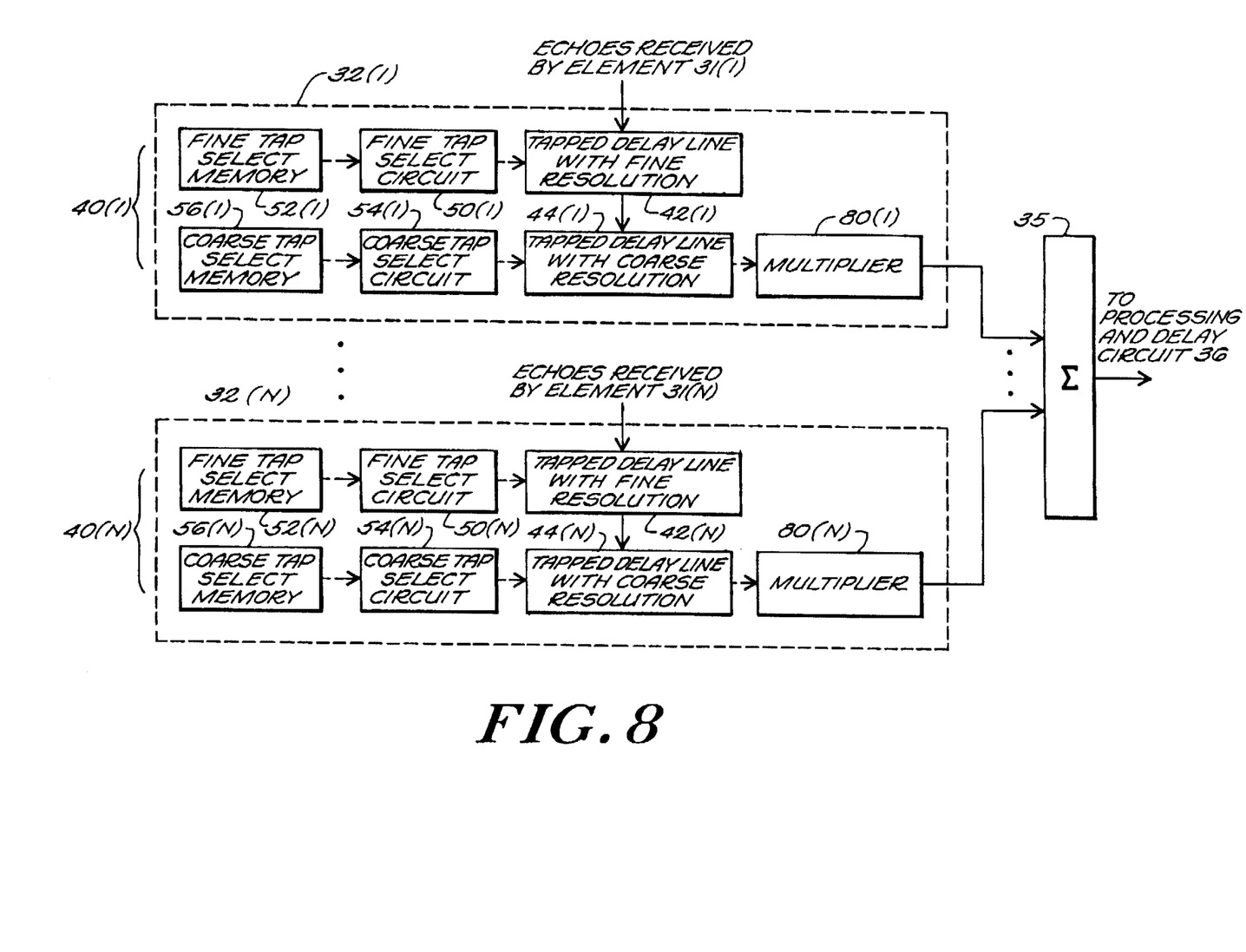
FIG. 8 shows an operational block diagram of an alternative embodiment of the present invention in which the selected outputs of each beam forming and focusing circuit are applied to respective multiplier circuits.

An operational block diagram of another alternative embodiment of the present invention is shown in FIG. 8, in which the selected outputs of each coarse delay line 44(1)–44(N) are applied to respective multiplier circuits 80(1)–80(N) prior to being provided to the summation circuit 35. An exemplary multiplier for use in the aforementioned embodiment of the present invention is described in U.S. Pat. No. 5,535,150 issued on Jul. 9, 1996, entitled "Single Chip Adaptive Filter Utilizing Updatable Weighting Techniques", incorporated herein by reference.

The configuration of the multipliers 80 will accommodate the use of apodization techniques, such as incorporating a conventionally known Hamming weighting or code at the receiving array to reduce the sidelobe level and generate better quality imagery. Similar to the embodiment shown in FIG. 6, latch circuits 60(1)–60(N) may be included in association with each of the processing circuits 32(1)–32(N) in order to control the latching of the tap select position for the fine delay lines 42(1)–42(N). Conventional apodization and Hamming weighting techniques are described in, for example, Gordon S. Kino, *Acoustic Waves: Devices, Imaging, and Analog Signal Processing*, Prentice-Hall Inc. (1987), incorporated herein by reference.

Figure 9:
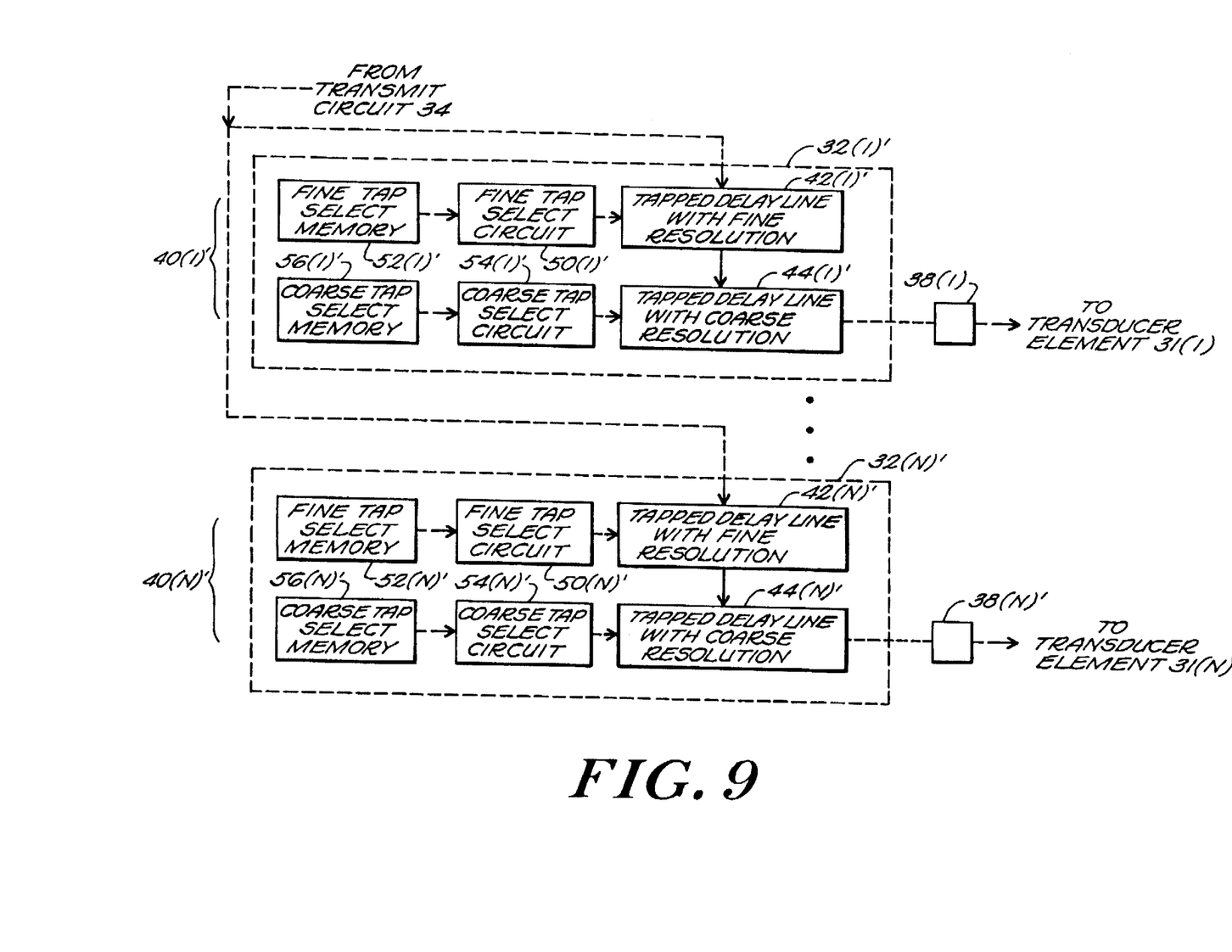
FIG. 9 shows an operational block diagram of an alternative embodiment of the present invention in which a plurality of beam forming and focusing circuits of the present invention are arranged for operation in a transmission mode.

FIG. 9 shows an operational block diagram of an alternative embodiment of the present invention in which a plurality of processing circuits 32(1)'–32(N)', which define a set of N-parallel processing channels 40(1)'–40(N)', are arranged for operation in a transmission mode. The processing circuits 32' are nearly identical to the processing circuits described with reference to FIG. 5. Each processing circuit includes two cascading tapped delay lines 42(1)'–42(N)' and 44(1)'–44(N)'. The first delay line 42' in each processing channel provides a fine time delay for the signals to be transmitted, while the cascaded second delay line 44' provides a coarse time delay. Each fine delay line has an associated programmable fine tap select circuit 50(1)'–50(N)', which receive tap select addresses from respective fine tap select memory units 52(1)'–52(N)'. Each coarse delay line has an associated programmable coarse tap select circuit 54(1)'–54(N)', which receive tap select addresses from respective fine tap select memory units 56(1)'–56(N)'. The tap-select circuits are operable for effecting a variable delay time as a function of tap location.

During the operation of the processing circuits 32' in the transmission mode, appropriately conditioned signals which are provided from the control circuit 33, as shown in FIG. 3, are applied continuously to the inputs of each processing channel 40'. The input signals to each processing channel are converted into a sequence of sampled data for initial propagation through the respective fine tapped delay line 42'. In an exemplary configuration of the processing circuits 32' using CCD delay lines, the input signals to each of the processing channels are converted to a sequence of charge packets for subsequent propagation through the fine and coarse delay lines.

At a predetermined time, which is dependent on the tap location selected by the imaging system, a delayed sample is either destructively or nondestructively sensed from the selected tap of the fine delay line 42'. The delayed sample is in turn input to the front end of the corresponding coarse delay line 44'. The selected delay samples thereafter propagate through the coarse delay line, and are again either destructively or nondestructively sensed at a properly selected tap location corresponding to a predetermined time delay designated in accordance with the operation of the control circuit 33 of the ultrasound imaging system 30 in which the invention is utilized. The sensed sampled data from each of the coarse delay lines are then provided to the respective driving circuits 38(1)–38(n) converted and transmitted as ultrasonic pulse signals by the corresponding transducer elements 31. In accordance with a preferred embodiment of the present invention, the fine and coarse delay lines of each processing circuit have differing clock rates. In the transmission mode, the fine delay line can be clocked at either a higher or lower rate than that of the coarse delay line in order to accomplish the desired beam forming and focusing.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. An integrated ultrasound image data processing system comprising:
    a first charge-coupled device (CCD) tapped delay line having a plurality of delay units operable for receiving imaging signals from a signal source;
    a selection control circuit operable for reading said imaging signals from a selected first delay unit of said first delay line so as to correspond to a first selected time delay to effect fine delay resolution of said imaging signals; and
    a second CCD tapped delay line having a plurality of delay units operable for receiving said imaging signals from said selected first delay unit, said selection control circuit being further operable for reading said imaging signals from a selected second delay unit of said second delay line so as to correspond to a second selected time delay to effect coarse delay resolution of said imaging signals received from said first delay line, wherein
    said first and second CCD tapped delay lines and said selection control circuit are integrated on a single microchip.

2. The system of claim 1, wherein said imaging signals are converted into discrete charge packets for processing in said first and second delay lines.

3. The system of claim 1 further comprising an output circuit for reading said imaging signals from said selected second delay unit to produce delayed output imaging signals.

4. The system of claim 3, wherein said output circuit provides said delayed output signals to an ultrasonic transducer which generates a focused directional beam.

5. The system of claim 3 further comprising a summation circuit which is operable for summing said delayed output imaging signals.

6. The system of claim 1, wherein said selection control circuit further comprises a first selection unit for selecting said delay units of said first delay line and a second selection unit for selecting said delay units of said second delay line.

7. The system of claim 6, wherein said first and second selection units respectively comprise first and second memory units for storing addresses associated with said selected delay units of said first and second delay lines, which respectively correspond to said first and second selected time delays.

8. The system of claim 1, wherein said source of imaging signals comprises an ultrasonic transducer.

9. The system of claim 8, wherein said imaging signals comprise signals representative of reflected ultrasound energy from a target object.

10. The system of claim 1, wherein said signal source comprises a circuit that generates signals which are to be converted to ultrasonic pulses subsequent to being subjected to said fine and coarse delay resolutions.

11. An integrated image data processing system for ultrasound beam-forming and focusing, said system comprising:

a plurality of processing circuits which differentially delay signals representative of image waveforms, received as reflected ultrasonic energy from a target object by an array of receivers, in order to generate a focused image, each of said processing circuits including:

a first charge-coupled device (CCD) tapped delay line having a plurality of delay units operable for receiving signals representative of an image waveform and converting said signals into sampled data, a selection control circuit operable for reading said sampled data from a selected first delay unit of said first delay line so as to correspond to a selected first time delay to effect fine delay resolution of said image waveform, and a second CCD tapped delay line having a plurality of delay units operable for receiving said sampled data from said selected first delay unit, said control circuit being further operable for reading said sampled data from a selected second delay unit of said second delay line so as to correspond to a selected second time delay to effect coarse delay resolution of said image waveform; and a summation circuit operable for summing said sampled data from said selected second delay unit in each of said processing circuits in order to produce output image data corresponding to said focused image, wherein said plurality of processing circuits are integrated on a single microchip.

12. The system of claim 11, wherein said first and second delay lines comprise cascaded charge-coupled device tapped delay lines.

13. The system of claim 11, wherein said selection control circuit is further operable for determining which of said delay units of said first delay line is selected to effect variation in fine delay resolution with time.

14. The system of claim 11, wherein said selection control circuit further comprises a first selection unit for selecting said delay units of said first delay line and a second selection unit for selecting said delay units of said second delay line.

15. The system of claim 14, wherein said first and second selection units respectively comprise first and second memory units for storing addresses associated with said selected delay units of said first and second delay lines, which respectively correspond to said first and second selected time delays.

16. The system of claim 11, wherein said array of receivers comprise an array of ultrasonic transducers.

17. The system of claim 11, wherein each of said processing circuits further comprises a latching circuit operable for latching said selection control circuit to select a last delay unit of said first delay line as said selected first delay unit.

18. The system of claim 11, wherein each of said processing circuits further comprise a multiplier unit coupled between said second delay line and said summation circuit.

19. An integrated circuit for an ultrasound imaging system, comprising:

an integrated circuit having a plurality of charge-coupled device (CCD) tapped delay lines each of which includes a plurality of selectable tap locations, said CCD tapped delay lines receiving and propagating therethrough imaging signals associated with a signal source, said delay lines propagating said imaging signals in accordance with clocking signals received from a clocking source coupled to said plurality of CCD tapped delay lines;

a plurality of tap select circuits, each of said tap select circuits being electrically connected to a respective CCD tapped delay line, each of said tap select circuits selecting a tap location of the respective CCD tapped delay line; and a plurality of memory circuits, each of said memory circuits being electrically connected to a respective tap select circuit, wherein said CCD tapped delay lines, said tap select circuits and said memory circuits are integrated on a single microchip.

20. The system of claim 19, wherein said imaging signals are converted into discrete charge packets for processing in said CCD tapped delay lines.

21. The system of claim 19 further comprising an output circuit for reading said imaging signals from selected tap locations of said CCD tapped delay lines to produce delayed output signals.

22. The system of claim 21 further comprising a summation circuit which is operable for summing said delayed output signals.

23. The system of claim 21, wherein said output circuit provides said delayed output signals to an ultrasonic transducer which generates a focused directional beam.

24. The system of claim 19, wherein said memory circuits store addresses associated with said selectable tap locations of said CCD tapped delay lines.

25. The system of claim 24, wherein selected tap locations correspond to selected time delays.

26. The system of claim 19, wherein said signal source of said imaging signals comprises an ultrasonic transducer.

27. The system of claim 26, wherein said imaging signals comprise signals representative of reflected ultrasound energy from a target object.

28. The system of claim 19, wherein said signal source comprises a circuit which generates signals to be converted to ultrasonic pulses subsequent to being processed by said CCD tapped delay lines.

* * * * *